United States Patent
Kwak et al.

(10) Patent No.: US 12,524,860 B2
(45) Date of Patent: Jan. 13, 2026

(54) METHOD FOR EVALUATING VIDEO QUALITY BASED ON NON-REFERENCE VIDEO

(71) Applicant: INNOWIRELESS CO., LTD., Seongnam-si (KR)

(72) Inventors: Young Su Kwak, Suwon-si (KR); Sung Man Hong, Wonju-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 357 days.

(21) Appl. No.: 18/128,145

(22) Filed: Mar. 29, 2023

(65) Prior Publication Data

US 2023/0316483 A1 Oct. 5, 2023

(30) Foreign Application Priority Data

Mar. 30, 2022 (KR) .......................... 10-2022-0039854

(51) Int. Cl.
*G06T 7/00* (2017.01)

(52) U.S. Cl.
CPC ........................ *G06T 7/0002* (2013.01); *G06T 2207/10016* (2013.01); *G06T 2207/10024* (2013.01); *G06T 2207/20081* (2013.01); *G06T 2207/20084* (2013.01); *G06T 2207/30168* (2013.01)

(58) Field of Classification Search
CPC ......... G06T 7/0002; G06T 2207/10016; G06T 2207/10024; G06T 2207/20081; G06T 2207/20084; G06T 2207/30168

USPC ........................................................ 382/157
See application file for complete search history.

(56) References Cited

FOREIGN PATENT DOCUMENTS

| KR | 10-1279705 B1 | 6/2013 |
| KR | 10-2020-0044652 A | 4/2020 |

OTHER PUBLICATIONS

Jiang, Jiu, et al. "Multi-dimensional feature fusion network for no-reference quality assessment of in-the-wild videos." Sensors 21.16 (2021): 5322. (Year: 2021).*

(Continued)

*Primary Examiner* — Jonathan S Lee
(74) *Attorney, Agent, or Firm* — Kaplan Breyer Schwarz LLP

(57) ABSTRACT

A method for evaluating video quality based on a non-reference video to evaluate the quality of a received video using artificial intelligence composed of convolutional neural networks (CNN) and recurrent neural networks (RNN) capable of setting a learning range, includes: (a) extracting RGB values for one frame of a video; (b) obtaining an output by providing the extracted RGB values to CNN No. 1; (c) obtaining an output by providing the extracted RGB values n times to a CNN; (d) repeating (a) to (c) for all frames and merging outputs of all CNNs; (e) obtaining the output of the RNN with the time dimension reduced to 1 after passing the merged output value to the RNN; and (f) after applying a regression algorithm to the final output of the RNN, predicting this value as video quality value.

7 Claims, 9 Drawing Sheets

(56) References Cited

OTHER PUBLICATIONS

Agarla, Mirko, Luigi Celona, and Raimondo Schettini. "No-reference quality assessment of in-capture distorted videos." Journal of Imaging 6.8 (2020): 74. (Year: 2020).*
Liang, Yuanhao, Eric Hiu Kwong Yeung, and Yong Hu. "Parallel CNN classification for human gait identification with optimal cross data-set transfer learning." 2021, CIVEMSA. pp. 1-6 (Year: 2021).*
Jang, Hyeongnam, and Jong-Seok Lee. "Analysis of deep features for image aesthetic assessment." IEEE Access 9 (2021): 29850-29861. (Year: 2021).*

\* cited by examiner

METHOD FOR EVALUATING VIDEO QUALITY BASED ON NON-REFERENCE VIDEO

CROSS-REFERENCE TO RELATED APPLICATION

This application claims priority to and the benefit of Korean Patent Application No. 10-2022-0039854, filed on Mar. 30, 2022, the disclosure of which is incorporated herein by reference in its entirety.

FIELD

The present disclosure relates to a method for evaluating video quality based on a non-reference video, and in particular, to a method for evaluating video quality based on a non-reference video to evaluate the quality of a received video without an original video using artificial intelligence composed of a plurality of convolutional neural networks (CNN) and recurrent neural networks (RNN) capable of setting a learning range.

BACKGROUND

FIG. 1 is a graph showing an increasing video traffic demand in a wireless communication environment. As shown in FIG. 1, network traffic demand for video is increasing due to the recent introduction of the 5th generation mobile communication system, an increase in the number of 5th generation subscribers, and an increase in demand for remote work.

However, as for a method for evaluating the quality of a received video perceived by a user in a non-reference method without an original video, an algorithm designed manually by a person is still known. That is, around 10 KPIs (Key Performance Indicators), such as BPS (Bit Per Second), brightness and blur, are used as inputs to algorithms such as SVM (Support Vector Machine) to evaluate, and considering that the method for evaluating the quality of video by human is very high-level, there is a problem that is difficult to operate properly.

Specifically, methods for evaluating the quality of received video data in the related art may be largely classified into three types.
  a. After obtaining both the original video and the received video, the quality of the received video data is evaluated by calculating the delay time through a mathematical algorithm (full-reference method).
  b. After obtaining some information on the original video and the received image, the quality of the received video data is evaluated by calculating the degree of color space change through a mathematical algorithm (reduced-reference method).
  c. The quality of received video data is evaluated only with the received video (non-reference method).

In the case of the above-mentioned full-reference method, since the original video and the received video may be used, it is easy to design an algorithm for obtaining the quality of the received video, and the error between the predicted quality of the received video and the quality perceived by a person is generally smaller than that of the non-reference method. On the other hand, in a real communication environment, it is extremely rare for a receiver to have an original video, so it is not applicable in most real environments (refer to Prior Art 1 below).

In the case of the reduced-reference method described above, while there is an advantage in that the quality of the received video may be predicted even if only some information is available without having all of the original video, there is a burden that requires additional information processing and information transmission in order to apply it in a real environment, which is an obstacle in applying it to a real environment.

Lastly, in the case of the non-reference method, while there is an advantage that quality prediction is possible only with the received video, it has a disadvantage that it is very difficult to design an algorithm for determining the quality of received video data only with the received video. Accordingly, most of the non-reference methods are designed as an algorithm that predicts the quality of the received video by utilizing dozens of KPIs such as BPS, brightness, and blur, but there is a problem that the error between the predicted quality of the received video and the quality perceived by the actual person is large compared to the full-reference method since the algorithm is relatively simple (see Prior Art 2 below).

LITERATURE IN THE RELATED ART

Literature 1 in the related art: Patent Application Publication No. 10-2020-0044652 (Title of Invention: Method and Apparatus for Evaluating Subjective Quality of Video)

Literature 2 in the related art: Registered Patent Publication No. 10-1279705 (Title of Invention: Method for Measuring Blur in Video Frame, and Apparatus and Method for Measuring Image Quality of Video Frame Using Same)

SUMMARY

Technical Goals

The present disclosure was made to solve the above matters and for the purpose of providing a method for evaluating video quality based on a non-reference video that evaluates the quality of a received video without an original video using artificial intelligence composed of a plurality of convolutional neural networks (CNNs) and recurrent neural networks (RNNs) capable of setting a learning range.

Technical Solutions

A method for evaluating video quality based on the non-reference video of the present disclosure for achieving the above object may include: Operation (a) of extracting Red, Green, Blue (RGB) values for one frame of a video; Operation (b) of obtaining an output by providing the extracted RGB values to CNN No. 1; Operation (c) of obtaining an output by providing the extracted RGB values n times (n≥an integer greater than or equal to 2) to a CNN; Operation (d) of repeating Operations (a) to (c) for all frames and merging outputs of all CNNs; Operation (e) of obtaining the output of the RNN with the time dimension reduced to 1 after passing the merged output value to the RNN for learning in the time dimension; and Operation (f) of, after applying a regression algorithm to the final output of the RNN so that the output value becomes one dimension, predicting this value as video quality value.

In the above configuration, some convolutional layers of CNN No. 1 are disabled for learning, while others are enabled for learning.

Some convolutional layers of CNN No. 1 are pre-learned with a plurality of ImageNet learning data and have fixed coefficients, and the remaining convolutional layers of CNN No. 1 start learning from the pre-learned coefficients, but additional learning is possible.

The n is 2, some convolutional layers of CNN No. 2 are pre-learned with a plurality of image learning data different from CNN No. 1 and the coefficients are fixed, and the remaining convolutional layers of CNN No. 2 start learning from the pre-learned coefficients, but additional learning is possible.

In the learning operation, the error backpropagation is used.

In the RNN, except for the frame number dimension responsible for the concept of time, the remaining data is changed to the dimension of the total number of filters through global average pooling, and operates as a one-dimensional RNN.

Effects

According to the method for evaluating video quality based on the non-reference video of the present disclosure, a true non-reference video quality monitoring system that requires only the video itself may be implemented with AI, and at the same time, it is possible to increase the correlation between the MOS (Mean Opinion Score) value by person and AI's predicted value, thereby it is possible to greatly increase consumer satisfaction in line with the rapidly increasing demand for video in accordance with the advent of the untact era by reflecting a plurality of convolutional neural networks capable of setting the learning range into the AI structure design instead of the KPI method or the quality evaluation algorithm in the related art devised mathematically by person.

Meanwhile, a low MOS value is also correlated with disturbances in the filming environment, and since the method of the present disclosure is a system for measuring the MOS value of a video using only the video itself, it is possible to determine whether there is an obstacle in the camera filming environment in a future autonomous driving system and the like, as a result, when the camera is covered by dust or a piece of wood in an autonomous driving system, it is possible to prevent a major life-threatening accident that may be caused by not properly identifying it.

DETAILED DESCRIPTION

Hereinafter, a preferred example embodiment of a method for evaluating image quality based on a non-reference video according to the present disclosure will be described in detail with reference to the accompanying drawings.

As is well known, artificial neural networks not only learn from data alone without human subjectivity, but also it may operate at a higher level than the method using around dozens of KPIs in the point that the original video itself is used as an input characteristic.

Figure 1:
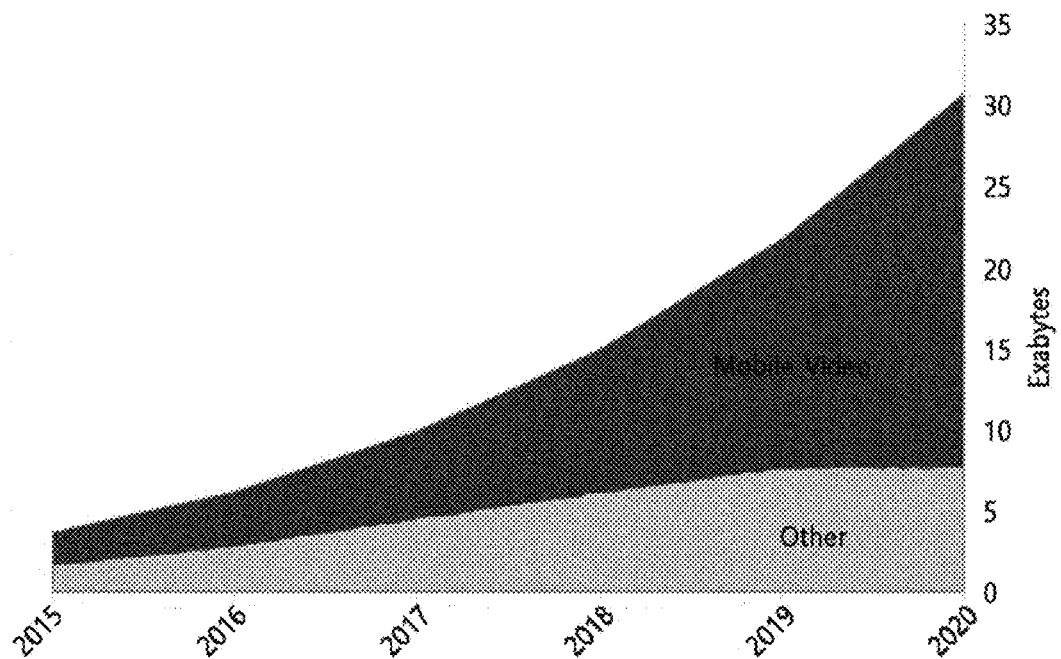
FIG. 1 is a graph showing an increasing video traffic demand in a wireless communication environment.
Figure 2:
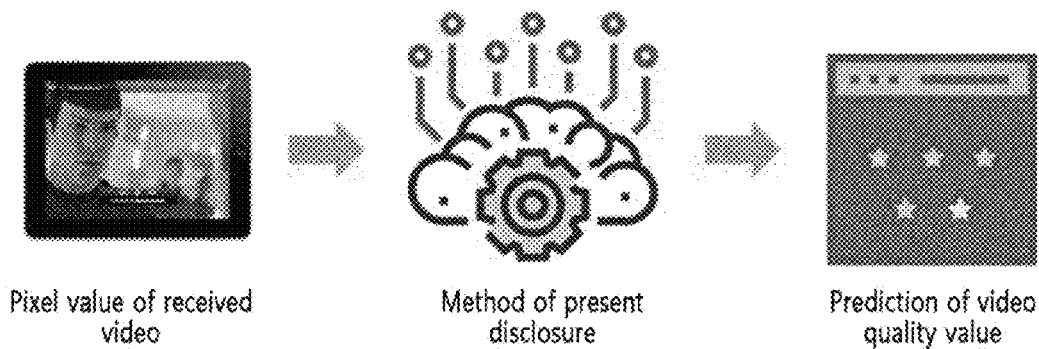
FIG. 2 is a diagram for explaining the outline of the method for evaluating video quality based on non-reference video according to the present disclosure.

FIG. 2 is a diagram for explaining the outline of a method for evaluating video quality based on non-reference video according to the present disclosure. As shown in FIG. 2, according to the method of the present disclosure, a plurality of convolutional neural networks is used so that the artificial neural network may sufficiently extract meaningful characteristics only with pixel values of a video, and a recurrent neural network is used to learn the concept of time, but in order to increase the accuracy of measurement (prediction) during artificial intelligence learning, the convolutional neural network and the recurrent neural network should be trained simultaneously.

In addition, it operates by receiving only pixel values of the received video as input instead of an algorithm that operates based on dozens of KPIs such as BPS (Bit Per Second), brightness, and blur and the like.

If KPI is used, if there are 20 KPIs in use, the input value of the algorithm is (20× video length), but if pixel values are used, a truly non-reference video quality evaluation algorithm that is much higher-dimensional and does not require any additional information such as KPIs, with "the number of channels×the horizontal width of the video (width)×the vertical width of the video (height)×the length of the video" as input values may be designed. The difficulty of the existing learning operation is achieved by improving the AI structure.

Figure 3:
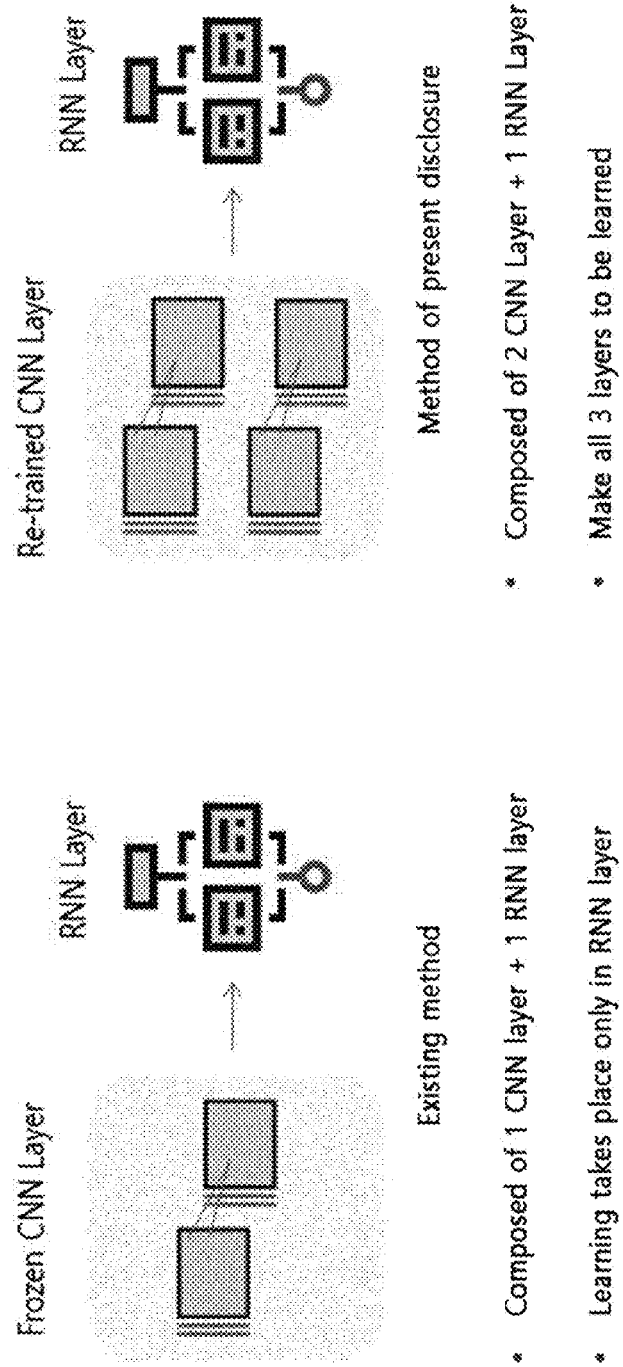
FIG. 3 is a schematic diagram for summarizing and explaining the method for evaluating video quality based on non-reference video according to the present disclosure.

FIG. 3 is a schematic diagram for summarizing and explaining the method for evaluating the video quality based on the non-reference video of the present disclosure. As shown in FIG. 3, according to the method of the present disclosure, a convolutional neural network (CNN) and a recurrent neural network (RNN) capable of setting a plurality of learning ranges are used, but they are learned at once. There is a concern that over-fitting may occur in the learning operation of AI that operates in the method using pixel values as described above because it is difficult to secure hundreds of thousands or more of training data in which the video and the quality value assigned by a person are present as correct answers. Accordingly, for example, CNN is pre-learned on millions of images in ImageNet which is an image database, but in order to additionally prevent over-fitting for ImageNet, selective learning is possible only for some convolution layers of CNN.

This prevents over-fitting for both ImageNet and video data. In addition, by allowing multiple image learning data other than ImageNet to be used so that selectively learnable CNNs may become plural, the generalization effect due to the increase in image-based learning data sets may be further doubled.

Figure 4:
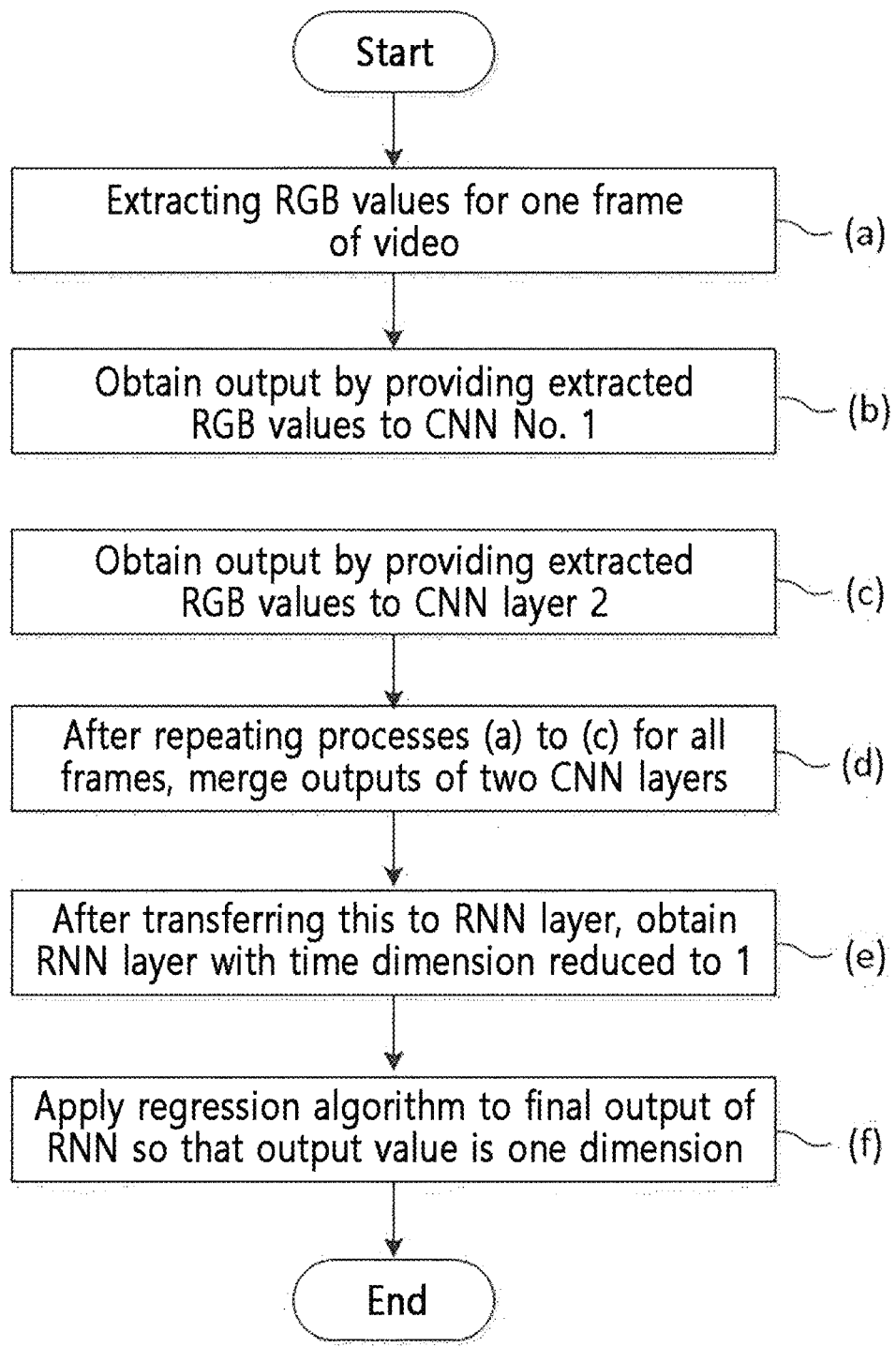
FIG. 4 is a flowchart for describing the method for evaluating video quality based on non-reference video according to the present disclosure.

FIG. 4 is a flowchart for describing a method for evaluating video quality based on a non-reference video according to the present disclosure. As shown in FIG. 4, the method for evaluating video quality based on non-reference video of the present disclosure may include: Operation (a) of extracting RGB values for one frame of a video, for example, when the number of CNNs is 2; Operation (b) of obtaining an output by providing the extracted RGB values to CNN No. 1 (At this time, some of the convolutional layers existing in CNN No. 1 are made impossible to learn, while some are set to be able to learn. In this way, since only some convolutional layers of CNN may be learned, the CNN which is pre-learned for images is prevented from being over-fitted only to either image or video data, while allowing the CNN to perform additional learning on image data.); Operation (c) of obtaining an output by providing the extracted RGB values to CNN No. 2; Operation (d) of repeating Operations (a) to (c) for all frames and merging the outputs of the two CNNs; Operation (e) of obtaining the output of the RNN with the time dimension reduced to 1 after passing the merged output value to the RNN for learning in the time dimension; and Operation (f) of predicting this value as video quality value after applying a regression algorithm to the final output of the RNN so that the output value becomes one dimension. In the method of the present disclosure, it is learned using error backpropagation in the learning operation.

Hereinafter, each operation of the method for evaluating video quality based on the non-reference video of the present disclosure will be described in detail.

Operation (a): Extracting RGB Value for One Frame of Video

The non-reference video quality evaluation artificial neural network according to the method for evaluating video quality based on the non-reference video of the present disclosure is possible to stably evaluate the video quality in a non-reference method by not requiring other information other than the received video, that is, by not requiring other prerequisites such as the need for information other than the received video. In addition, since information other than the received video is not required, there is an advantage in that additional time such as calculation of information is not required.

However, since the video needs to be expressed mathematically in order for the machine to understand the video, an operation of converting each frame of the video into RGB values is required.

Figure 5:
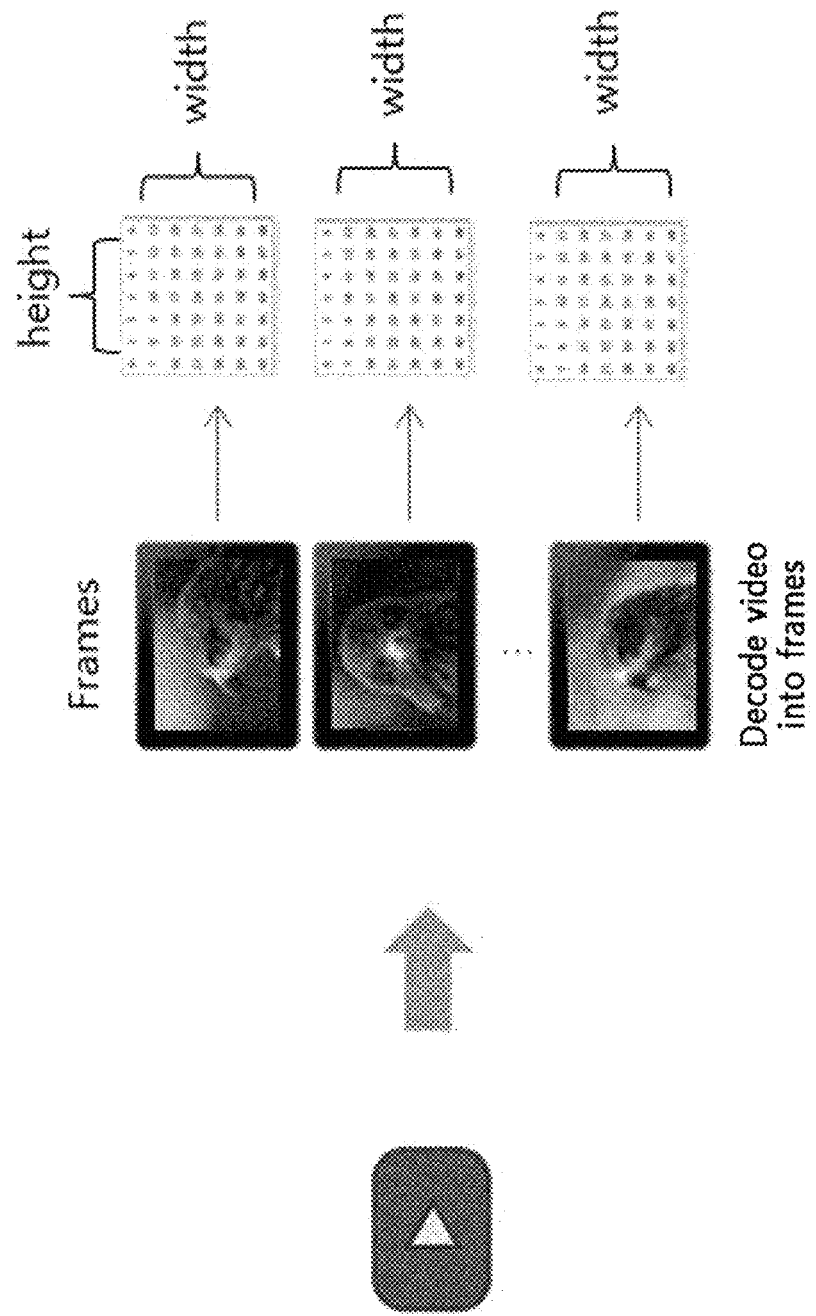
FIG. 5 is a diagram for exemplarily showing an operation of decoding a video frame by frame in the method for evaluating video quality based on non-reference video according to the present disclosure.

FIG. 5 is a diagram exemplarily illustrating an operation of decoding a video frame by frame in the method for evaluating video quality based on the non-reference video of the present disclosure. As shown in FIG. 5, for example, if a video is made of 30 frames per second (fps) and has a playback length of 8 seconds, it becomes a video having 240 frames. Also, for example, if the height of a video is 540 pixels and the width is 960 pixels, one frame becomes a matrix expressed as 3×540 ×960, and in this case, the first 3 means an RGB color space. If RGB values are expressed in 8 bits, each RGB value may be expressed as 0 to 255 and when normalized by setting the maximum value to 255 and the minimum value to 0, it may be expressed as 0 to 1 and each step has a resolution of 1/255. In addition, the video is expressed as a matrix (form) of "number of frames×3 (number of R, G, B color spaces)×number of height pixels× number of width pixels".

Operation (b): Obtaining an Output by Providing the RGB Values Extracted in Operation (a) to CNN No. 1 (where the Learning Range May be Set)

The CNN proposed in the method for evaluating video quality based on the non-reference video of the present disclosure is a CNN pre-learned with images to avoid over-fitting that does not perform as good as the learning operation during actual prediction when it is difficult to secure hundreds of thousands of learning data in large quantities, in which the video and the quality value assigned by a person exist as correct answers so that the learning of artificial neural network is performed only with a video. At this time, CNN No. 1 may be a CNN pre-learned with millions of ImageNet learning data.

Here, if all the convolutional layers of the CNN are not learned at all, there is a problem in that the pattern contained between the video and the quality value may not be learned. Meanwhile, if all convolutional layers of CNN are learned, if the number of video data for learning is less than hundreds of thousands, over-fitting only to image data, that is, general patterns learned for images are lost and an over-fitting in which only the patterns existing in the video data are learned excessively occurs, so that, rather, it is likely to show worse generalization performance than the case when CNN is not learned. Therefore, in order to avoid over-fitting for both ImageNet and video data, some convolutional layers constituting CNN fix pre-learned coefficients from ImageNet so that they do not learn, and the remaining convolutional layers start to learn from pre-learned coefficients, but set to enable further learning.

Figure 6:
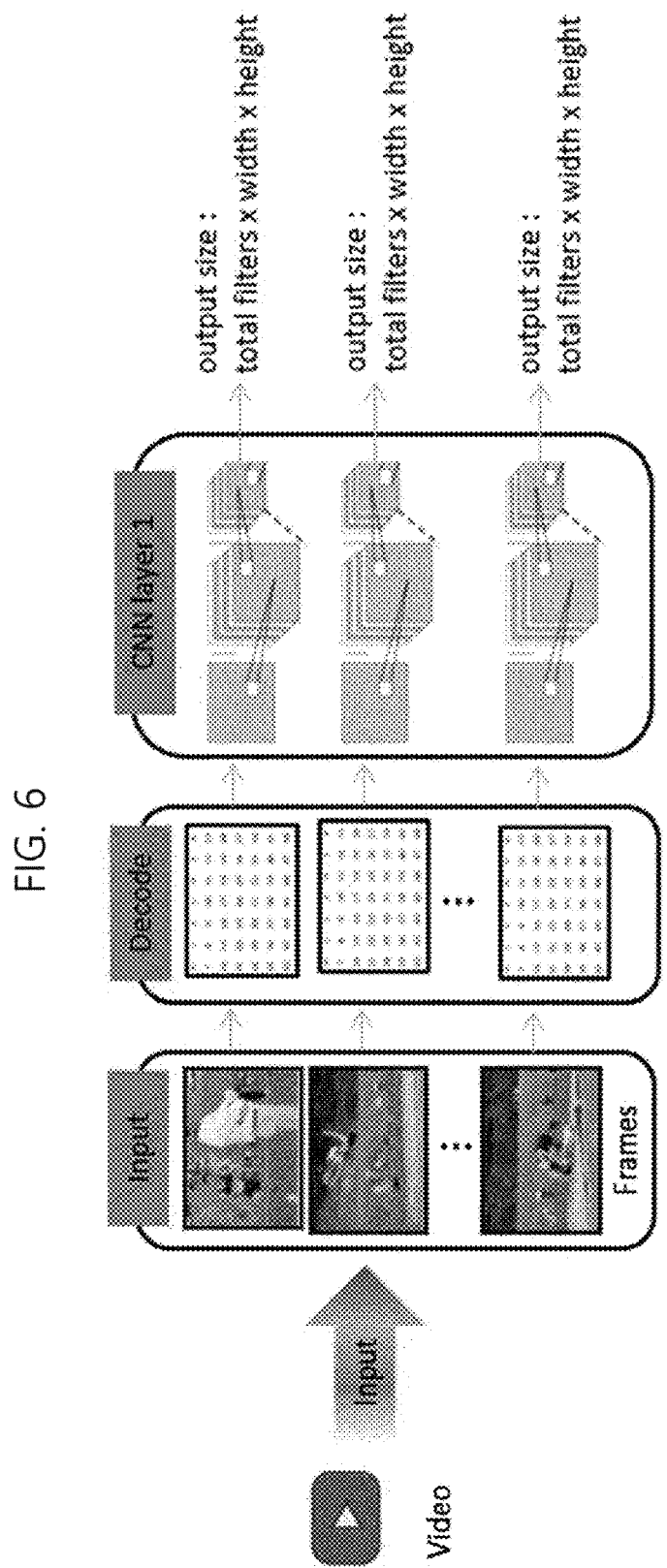
FIG. 6 is a schematic diagram for summarizing and explaining the operation of a CNN in the method for evaluating video quality based on non-reference video according to the present disclosure.

FIG. 6 is a schematic diagram for summarizing and explaining the operation of CNN in the method for evaluating video quality based on non-reference video of the present disclosure.

For example, in the case of Resnet50, which is well known as a CNN structure, there are a total of 48 convolution layers in one CNN, and in the method of the present disclosure, for example, 39 convolution layers are set to be impossible to learn, and only 9 convolution layers are set to be able to learn so that over-fitting may be prevented from occurring in both ImageNet and video data. In addition, as shown in FIG. 6, if data having a length of 3 (R, G, B color space)×height pixels×width pixels per frame is input to CNN No. 1, the output of CNN No. 1 is changed to the number of filters (the number of filters in the final convolution layer of the CNN)×the number of height pixels×the number of width pixels. This is because the number of RGB color spaces, 3, in the form of general input and output data of CNN is expressed by changing the number of filters of CNN.

Operation (c): Obtaining an Output by Providing the RGB Values Extracted in the Operation (a) to CNN No. 2 (where the Learning Range May be Set)

Assuming that the CNN in this operation is a CNN pre-learned with millions of ImageNet learning data as in the Operation (b), there is a risk of over-fitting to patterns learned only with ImageNet, so the method of the present disclosure proposes the use of multiple CNNs. For example, CNN No. 2 is assumed to be a neural network pre-learned with more than tens of thousands of image learning data different from CNN No. 1. In this case, to prevent CNN No. 2 from over-fitting for both image data and video data, some convolutional layers of the CNN fix the pre-learned coefficients, and the other convolutional layers start to learn from pre-learned coefficients, but set to enable further learning.

If the data having the length of 3 (R, G, B color space)×height pixels×width pixels per frame is the input of CNN No. 2, the output of CNN No. 2 is changed to the number of filters (the number of filters in the final convolution layer of the CNN)×the number of height pixels×the number of width pixels.

Operation (d): Merging the Outputs of the Two CNNs after Repeating Operations (a) to (c) for all Frames Specifically, when Operations (a) to (c) are repeated, the dimension of the number of frames is added to the output, and as a result, data with the number of two frames×number of filters×number of height pixels×number of width pixels is output. Assuming that the number of height pixels and width pixels of the images used in the two CNNs are the same, after the Operation (d), data having the number of frames×the total number of filters (the sum of all filters of multiple CNNs)×the number of height pixels×the number of width pixels is output.

Figure 7:
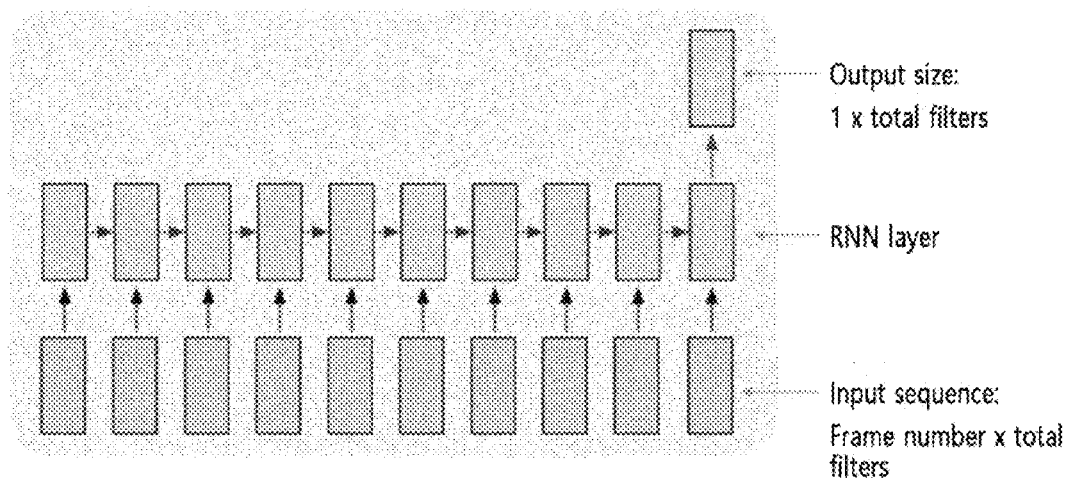
FIG. 7 is a schematic diagram for summarizing and explaining the operation of RNN in the method for evaluating video quality based on non-reference video according to the present disclosure.

Operation (e): Obtaining the Output of the RNN with the Time Dimension Reduced to 1 after Providing the Output Value of the Operation (d) to the RNN for Learning in the Time Dimension FIG. 7 is a schematic diagram for summarizing and explaining the operation of the RNN in the method for evaluating video quality based on the non-reference video of the present disclosure. As shown in FIG. 7, in the method of the present disclosure, an RNN is used to allow the concept of time to be learned for data with the length of the output of the Operation (d), the number of frames×the total number of filters (the sum of all filters of multiple CNNs)×the number of height pixels×the number of width pixels. At this time, the remaining data except for the dimension of the number of frames responsible for the concept of time in the RNN is changed to the dimension of the total number of filters through global average pooling so that it may operate as a one-dimensional RNN. Then, data having dimensions of the total number of filters, which is an output after the RNN receives data as many as the number of frames, is obtained as an output of the RNN (data of the dimension of the number of frames is removed through the RNN).

Operation (f): Applying a Regression Algorithm to the Final Output of the RNN so that the Output Value Becomes One Dimension.

Figure 8:
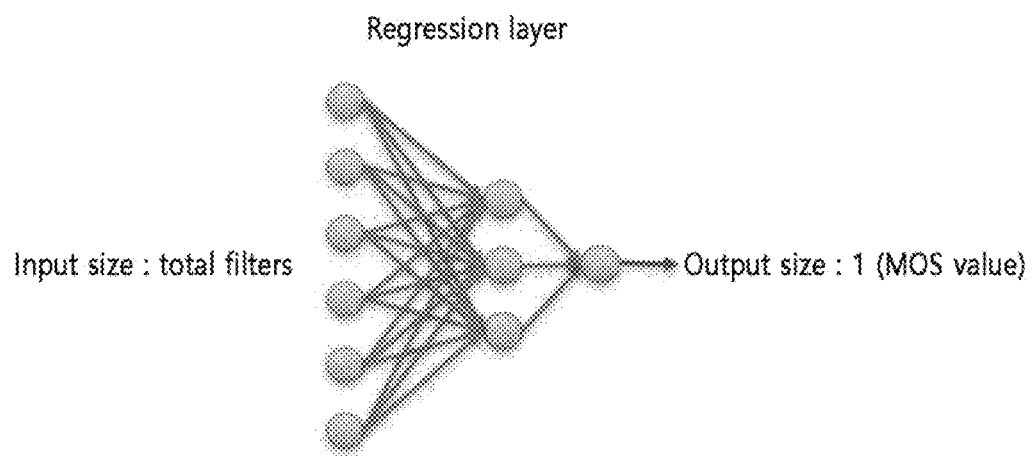
FIG. 8 is a schematic diagram for summarizing and explaining the operation of a regression layer in the method for evaluating video quality based on non-reference video according to the present disclosure.

FIG. 8 is a schematic diagram for summarizing and explaining the operation of a regression layer in the method for evaluating video quality based on non-reference video of the present disclosure. As shown in FIG. 8, in the method of the present disclosure, a regression algorithm is applied in order to be the dimension (MOS value) of 1 in the total number of filters, which is the output value of the Operation (e). Specifically, a regression algorithm is applied through a Rectified Linear Unit (ReLU) layer, but other activation functions and the like may be used.

If the neural network is a learned neural network, the MOS value, which is the quality value of the video, may be obtained by providing the received video as an input to the neural network through the above-described operation.

Figure 9:
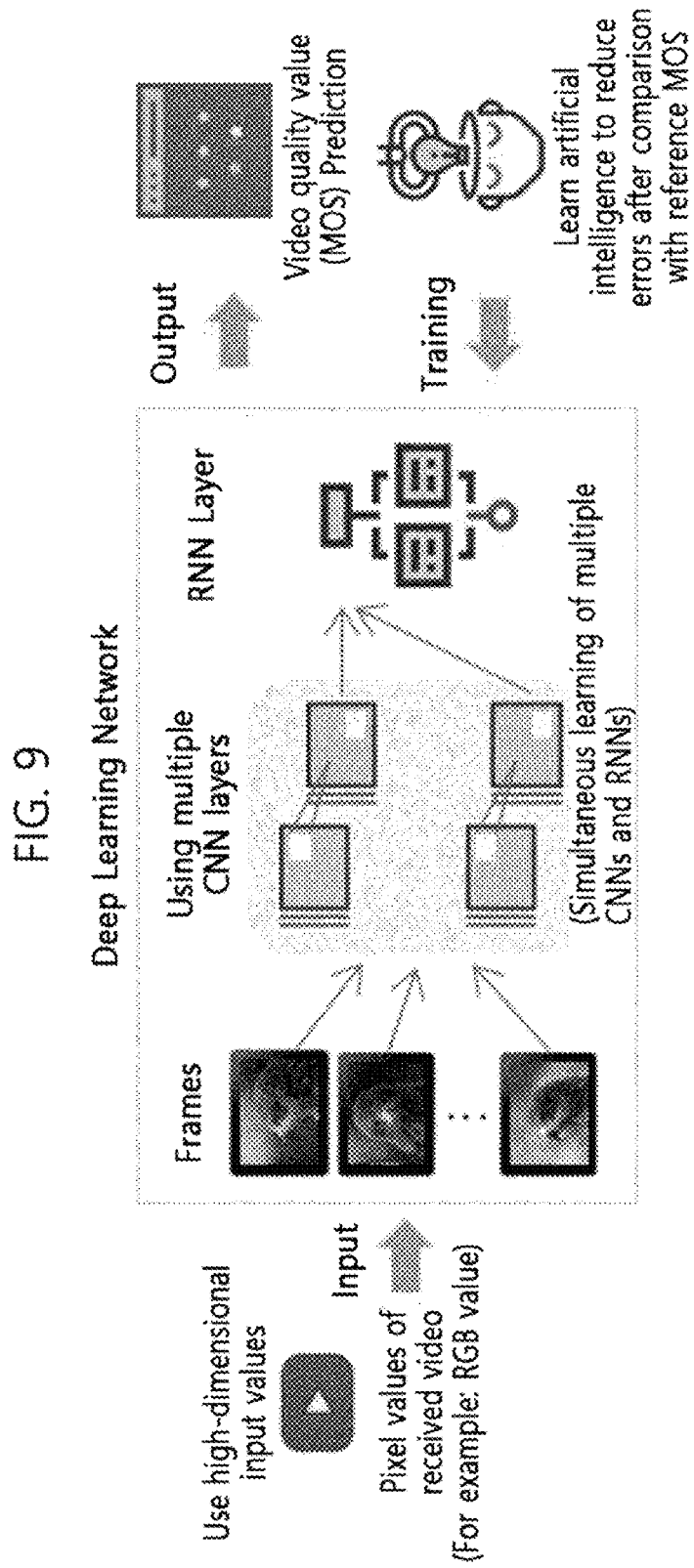
FIG. 9 is a schematic diagram summarizing and organizing the method for evaluating video quality based on non-reference video according to the present disclosure.

FIG. 9 is a schematic diagram summarizing and organizing the method for evaluating video quality based on the non-reference video in more detail according to the present disclosure. As shown in FIG. 9, in the method of the present invention, first, the CNN is prepared by learning it with image data and in this operation, for example, a data set of ImageNet, in which millions of image learning data exist, may be used.

Next, video data to be learned is prepared.

Finally, some of the convolutional layers of the CNN learned by the prepared images are selected to configure the convolutional layers to be re-learnable, while the rest of the convolutional layers are not re-learned, so that the characteristics of the convolutional layer that have already been learned are not changed even if learning proceeds.

Figure 10:
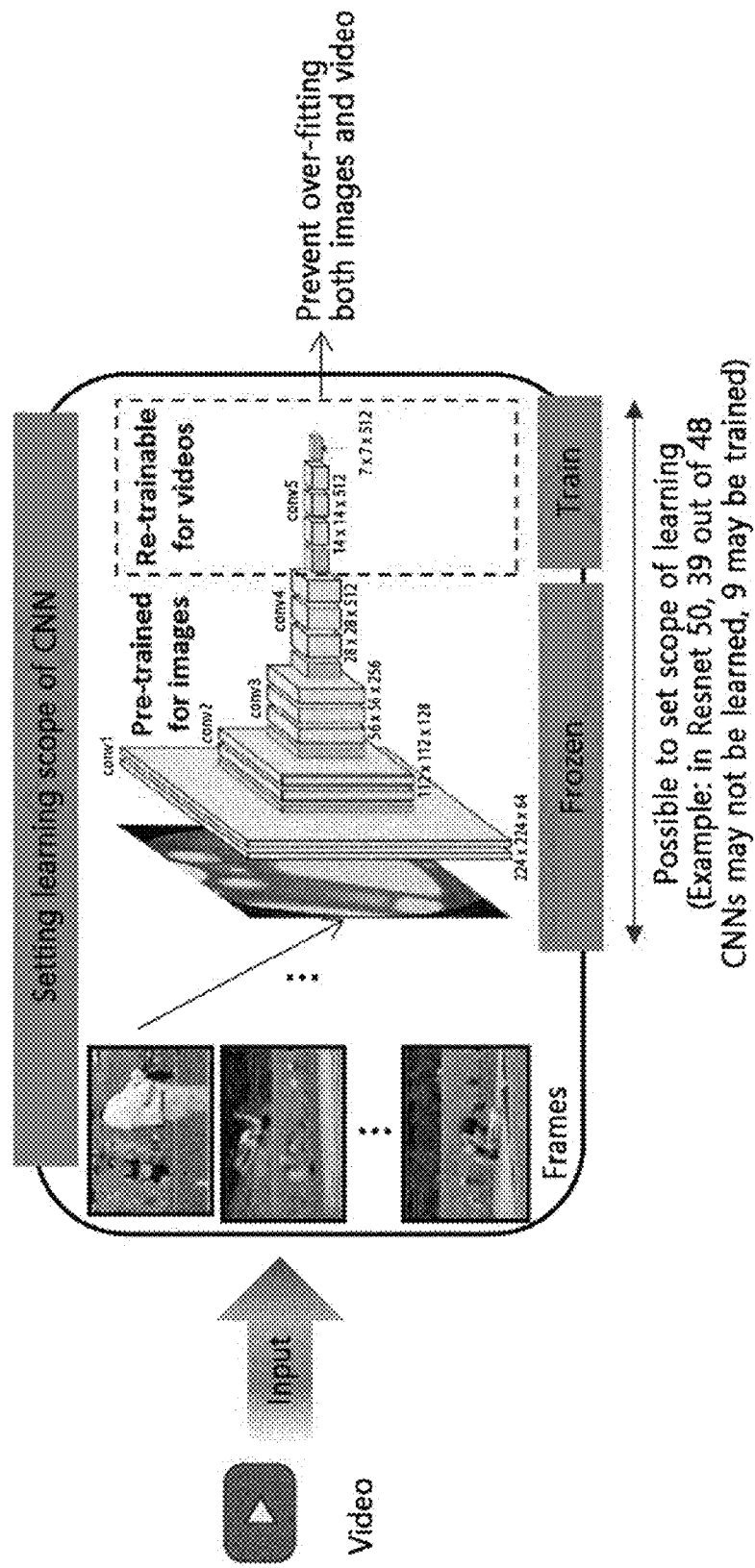
FIG. 10 is a diagram for explaining an example of setting a learning range of a CNN in the method for evaluating video quality based on non-reference video according to the present disclosure.

FIG. 10 is a diagram for explaining an example of setting a learning range of a CNN in the method for evaluating video quality based on non-reference video of the present disclosure.

Since there are usually a relatively larger number of image data sets than the video data set to be learned, the method of the present disclosure overcomes the limitation of small learning data by using an image data set in addition to the video data set, which is called transfer learning. In this operation, as shown in FIG. 10, after learning the CNN in advance with the image data and the correct answer label for the image data, only some convolution layers are selected so that the coefficients are changed in the operation of learning the video data. This is because there is a risk that the artificial neural network may be over-fitting only for the video data if all convolution layers are enabled to learn in the operation of learning the video data set.

Meanwhile, if only one CNN is used, an artificial neural network dependent only on ImageNet may occur, although it does not over-fit ImageNet. To prevent this, in the method of the present disclosure, a convolutional neural network capable of setting a learning range is extended to a plurality, and FIG. 11 is a diagram for explaining an example of preventing over-fitting by using a plurality of CNNs in the method for evaluating video quality based on the non-reference video of the present disclosure.

Figure 11:
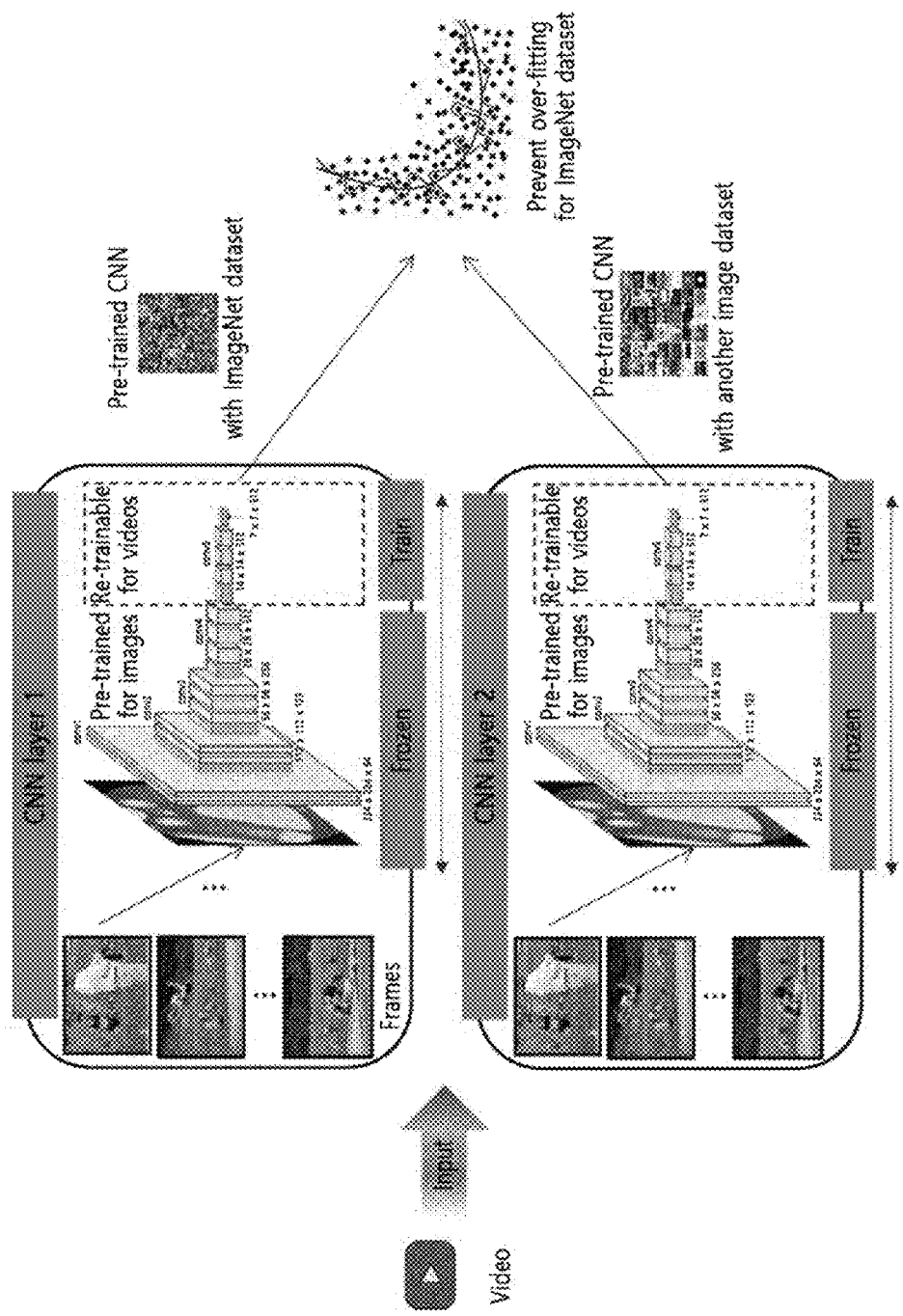
FIG. 11 is a diagram for explaining an example of preventing over-fitting by using a plurality of CNNs in the method for evaluating video quality based on non-reference video according to the present disclosure.

As shown in FIG. 11, according to the method of the present disclosure, there are a plurality of CNNs capable of setting a learning range, and each CNN shows a pre-learned figure based on different image data sets. Through this, the artificial neural network according to the method of the present disclosure may be more generalized and may utilize all patterns of various image data sets.

In the above, a preferred example embodiment of the method for evaluating video quality based on the non-reference video of the present disclosure has been described in detail with reference to the accompanying drawings, but this is only an example, and various modifications and changes may be possible within the scope of the technical idea of the present disclosure. Therefore, the scope of the present disclosure will be determined by the description of the claims below. For example, three or more CNNs may be configured.

What is claimed is:

1. A method for evaluating video quality based on a non-reference video, the method comprising:
   Operation (a) of extracting RGB values for one of a plurality of frames of a video;
   Operation (b) of obtaining an output value by providing the extracted RGB values to a convolutional neural network (CNN) No. 1;
   Operation (c) of obtaining an output by providing the extracted RGB values n times (n≥an integer greater than or equal to 2) to a CNN No. 2;

Operation (d) of repeating Operations (a) to (c) for all the frames of the video and merging outputs of CNN No. 1 and CNN No. 2 to generate merged output, the merged output having a frame number dimension and one or more other data dimensions;

Operation (e) comprising:

changing, via global average pooling, the one or more other data dimensions of the merged output to the sum of (1) the number of filters of CNN No. 1 and (2) the number of filters of CNN No. 2, to generate modified merged output, and obtaining an output of a recurrent neural network (RNN) with a time dimension reduced to 1 after passing the modified merged output to the RNN for learning in the time dimension; and Operation (f) of predicting a video quality value, after applying a regression algorithm to the output of the RNN to obtain a one-dimensional output value.

2. The method of claim 1, wherein:

the CNN No. 1 comprises a plurality of convolutional layers and wherein some of the convolutional layers of the CNN No. 1 are disabled for learning, while other ones of the convolutional layers of the CNN No. 1 are enabled for learning.

3. The method of claim 2, wherein:

certain ones of the convolutional layers of CNN No. 1 are pre-learned with a first plurality of image learning data and have a first plurality of fixed coefficients, and wherein remaining ones of the convolutional layers of CNN No. 1 start learning from the first plurality of coefficients, and wherein the first plurality of image learning data comprises ImageNet learning data.

4. The method of claim 3, wherein:

the n is 2, and the CNN No. 2 comprises a plurality of convolutional layers and wherein some of the convolutional layers of CNN No. 2 are pre-learned with a second plurality of image learning data different from the first plurality of image learning data and have a second plurality of fixed coefficients, and the remaining ones of the convolutional layers of CNN No. 2 start learning from the second plurality of coefficients.

5. The method of claim 3, further comprising additional learning of CNN No. 1.

6. The method of claim 4, wherein:

an error backpropagation is used in the learning of the RNN and non-frozen layers of CNN No. 1 and CNN No. 2 in Operation (e).

7. The method of claim 4, further comprising additional learning of CNN No. 2.

* * * * *